Feb. 13, 1968 — L. S. BIALKOWSKI — 3,368,820

SEAL ASSEMBLY

Filed Sept. 15, 1965 — 2 Sheets-Sheet 1

INVENTOR.
LUDWIK S. BIALKOWSKI
BY John D. Haney
ATTY.

Feb. 13, 1968  L. S. BIALKOWSKI  3,368,820
SEAL ASSEMBLY
Filed Sept. 15, 1965  2 Sheets-Sheet 2
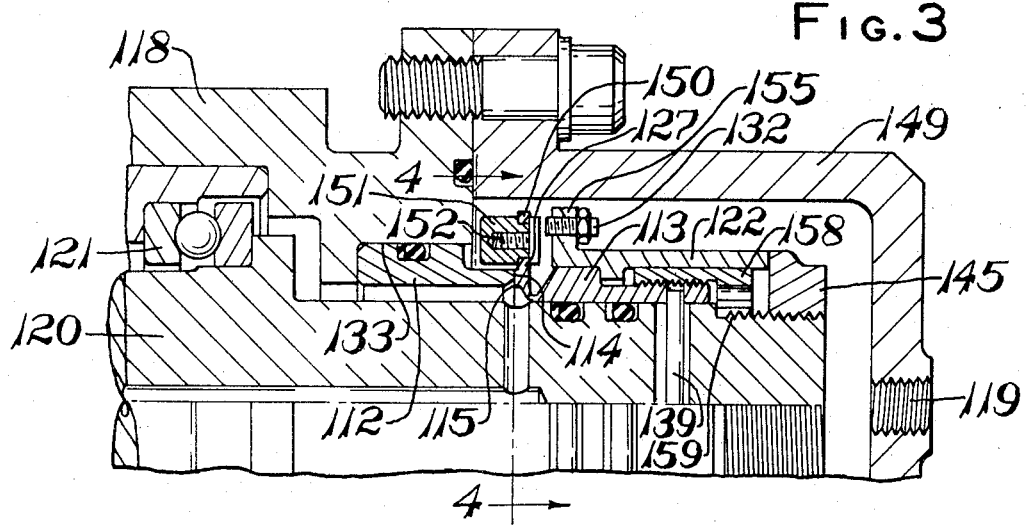
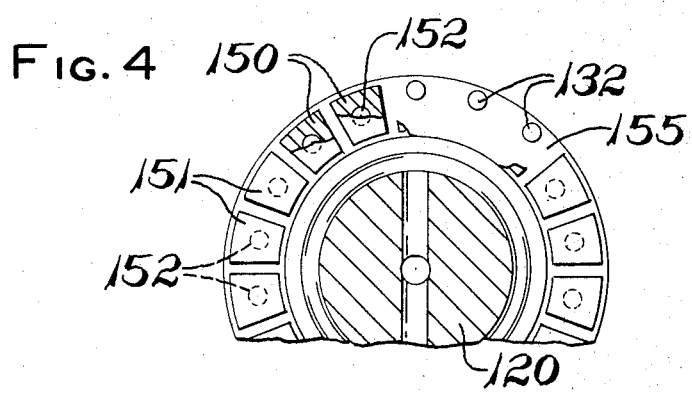
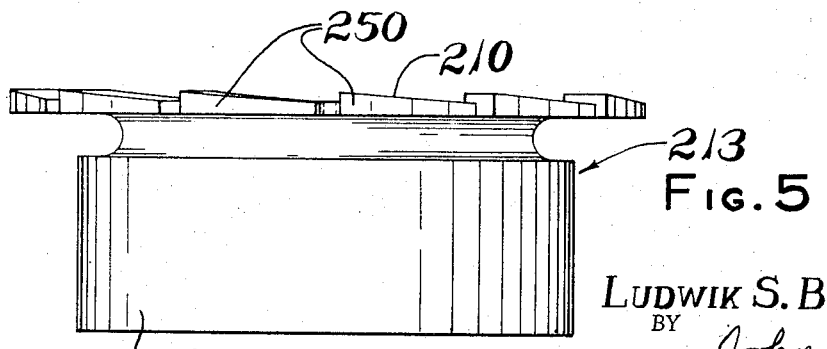
INVENTOR.
LUDWIK S. BIALKOWSKI
BY John D. Haney
ATTY.

United States Patent Office 3,368,820
Patented Feb. 13, 1968

3,368,820
SEAL ASSEMBLY
Ludwik S. Bialkowski, Troy, Ohio, assignor to The B. F. Goodrich Company, New York, N.Y., a corporation of New York
Filed Sept. 15, 1965, Ser. No. 487,497
3 Claims. (Cl. 277—25)

ABSTRACT OF THE DISCLOSURE

A rotary seal assembly of the sliding-contact class in which the relatively rotatable sealing members are biased axially against each other to form a fluid tight sliding seal at a plane mating interface. The rotary sealing member of the assembly operates in response to its rotational speed to vary the interface sealing load automatically. For this purpose the rotatable sealing member is provided with weights which circumferentially deflect the rotary member during rotation. Alternatively, the rotary member may be contoured so that it is deflected hydrodynamically by fluid in which the rotatable part operates to vary the inerface sealing load.

---

This invention relates to fluid pressure seals useful in hydraulic equipment between relatively rotating parts. The seal assemblies of this invention are of the class in which two relatively rotatable sealing members have axial mating sealing faces and the sealing members are urged axially toward each other to engage such sealing faces. Seal assemblies of this class are sometimes called "rotary seals" or "sliding-contact packings" in the literature of this art.

A seal assembly is provided, according to this invention, which functions automatically to vary the sealing load (i.e. the mechanical pressure) at the interface of the mating sealing members in response to the rotational speed of the rotatable sealing members. The interface pressure at the sealing faces is preferably varied by parts on the rotatable sealing member which are moved centrifugally as such sealing member is rotated. Alternatively the interface pressure may be varied hydrodynamically by shaping portions of the rotatable sealing member so that they interact with the fluid pressure medium acting on the sealing members. Combinations of these centrifugal and hydrodynamic effects may be used in a given seal assembly to effect the desired regulation of the sealing load. In any case, the interface pressure or sealing load at the sealing faces can be made to either increase or decrease as the rotational speed increases, depending on the special geometry selected for the regulatory parts of the rotatable sealing member.

The particular mode of regulation of the interface sealing load depends on the specific operating conditions intended for the seal assembly. For example, in one form of seal assembly described in this specification, the assembly is adapted to maintain static sealing engagement against high pressure for long periods, between very shorter periods of dynamic operation at high rotary speeds. This particular seal assembly is therefore designed with an adequately high sealing load during the static phase but with provision for automatically decreasing the sealing load to a very much lower amount during the dynamic phase of operation, thereby minimizing dynamic torque and wear on the sealing faces. Thereafter, when the seal assembly is returned to its static condition, the very much higher sealing load is automatically restored.

Under some operating conditions it may be desirable to increase the sealing load during dynamic operation of the seal to compensate, for example, for a change in viscosity of the fluid medium with an increase in temperature of the fluid during dynamic operation, so that a given leakage rate may be maintained at the seal or leakage prohibited, as desired. Under these conditions the seal assembly may be designed so that at operating speeds the sealing load is increased over that maintained at static conditions, rather than decreased as discussed in the previous paragraph.

In general, the foregoing results are accomplished by providing a rotary sealing member of the assembly which has its sealing face formed on a rigid diaphragm which is resiliently joined to the main body of the sealing member. The diaphragm further includes mass pieces which are responsive to centrifugal force to axially deflect the diaphragm, thereby moving the sealing face of the rotatable member toward or away from the mating sealing face on the non-rotatable sealing member. If hydrodynamic control is desired, parts of the diaphragm of the rotary member may have their fluid-exposed surfaces suitably contoured so that the diaphragm is axially deflected in the direction desired as the rotary sealing member turns in the working fluid. By appropriately selecting the mass, shape and resilience of these control parts, either the centrifugal or the hydrodynamic effect or combinations of these may be used to effect the desired regulation of the interface sealing load. One of the important advantages provided by this invention is the flexibility with which this seal assembly may be designed to provide the sealing loads desired.

The stiff annular diaphragm of the rotatable sealing member is integral with the body of the sealing member along an annular zone of the diaphragm which is substantially thinner than the portion on which the sealing face is formed so that the diaphragm is adapted for resilient deflection axially relative to the body. Suitable means is provided for biasing the sealing members toward each other to press their sealing faces against each other. Ordinarily the diaphragm is deflected axially by the biasing means to establish the initial load. The sealing faces of the sealing members may be eccentrically arranged relative to each for further efficiency in operation.

Certain preferred seal assemblies embodying this invention are shown in the accompanying drawings as examples of how this invention may be practiced. In the drawings:

FIG. 3 shows a partial axial cross section of another preferred seal assembly operating like the FIG. 1 assembly;

FIG. 4 is a detail view taken along the line 4—4 of FIG. 3; and

FIG. 5 is a semi-diagrammatic view showing a rotary sealing member designed for operation to vary the sealing load in response to hydrodynamic effects.

Figure 1:
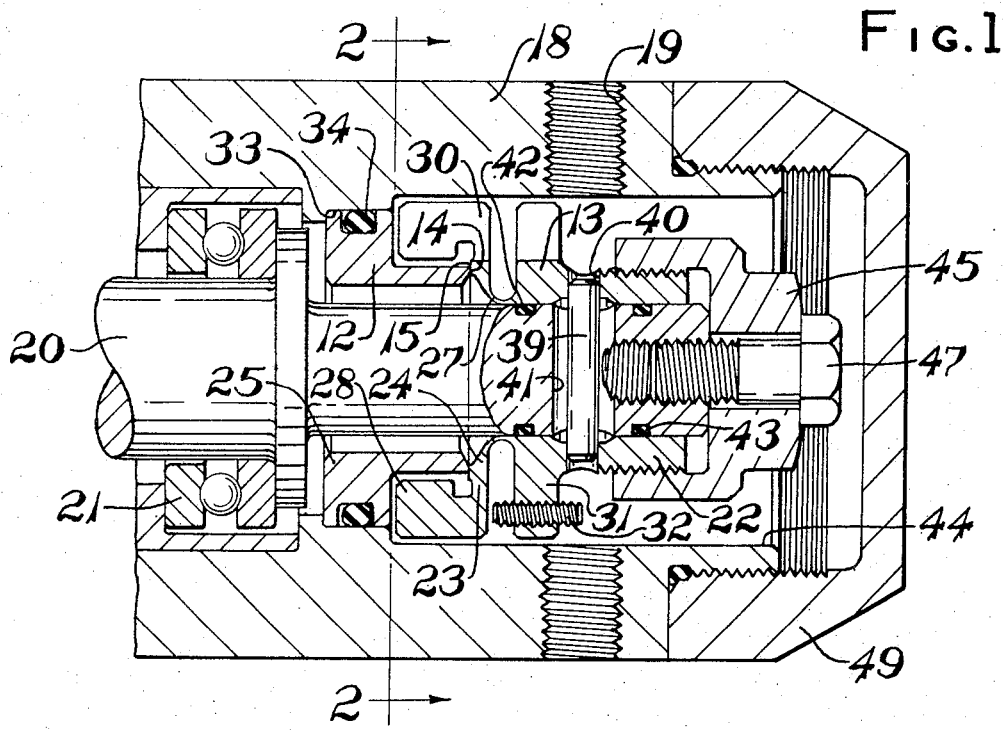
FIG. 1 shows an axial cross section of a preferred seal assembly responsive to centrifugal force of the rotary sealing member to reduce the sealing load as the rotational speed increases.

Referring to FIG. 1, a rotary assembly is provided having two sealing rings 12, 13 with opposing radial sealing faces 14, 15, respectively. The sealing rings 12 and 13 are mounted in a housing 18 adapted to receive fluid pressure through a port 19. Sealing ring 13 is adapted for rotation with a shaft 20 mounted on bearing 21 in housing 18. Sealing ring 12 is mounted rigidly in housing 18 and does not rotate.

Sealing ring 13 includes a rigid annular ring-like body 22 having an annular sealing diaphragm 23 integral therewith. The sealing diaphragm has a thick marginal region 24 on which is formed the plane circumferentially continuous sealing face 15. The opposing sealing ring 12 has a cylindrical body 25 terminating in sealing edge 14 which is shaped in the form of a plane annulus, the radial dimension of which is only several thousandths of an inch (e.g. 0.005 inch). This face or edge 14 may be rounded, however, or it may be quite sharp, all these forms being included under the general terms "knife" edge or "line contact" edge sometimes used in this description to refer to sealing edge 14.

Sealing diaphragm 23 is connected to the body 22 of ring 13 along an annular resilient flexible zone 27 which is very much thinner than the outer marginal region 24 of the diaphragm. The sealing diaphragm is axially deflectable relative to the body portion 22 along the zone 27. The thick marginal region 24 on which the sealing face 15 of ring 13 is formed provides hoop strength for the sealing diaphragm to keep face 15 plane when the diaphragm 23 as a whole is subjected to axial deflection. Also, this thick marginal region serves as a "heat sink" in that it has a relatively large heat capacity for accumulating heat generated at the interface of the sealing faces.

Figure 2:
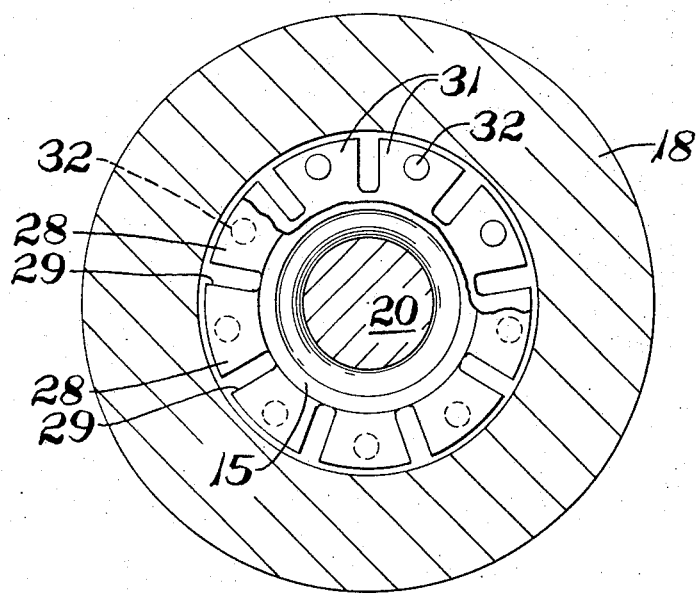
FIG. 2 is a detail view taken on the line 2—2 of FIG. 1.

As best shown in FIG. 2, the sealing diaphragm 23 further includes a series of massive arcuate block-like pieces 28 integral with the thick marginal region 24 of diaphragm 23. These block-like pieces 28 are arranged radially of the diaphragm with radial gaps 29 (see FIG. 2) separating adjoining pieces. The pieces 28 are of equal mass and they are spaced to provide dynamic balance for the sealing ring 13. The pieces 28 are each connected to the diaphragm margin at a relatively thin neck region 30 and the pieces each project radially and axially forwardly from the diaphragm margin 24, surrounding the cylindrical body portion 25 of the non-rotatable sealing ring 12.

The purpose of the mass pieces 28 is to provide a rotatable mass which remains in dynamic balance at all times but is responsive to centrifugal force when the sealing ring is rotated to deflect diaphragm 23 axially relative to body 22 of ring 13. As will be more fully explained in the following remarks, the geometry of pieces 28 in this embodiment is such that as the rotational speed of shaft 20 and ring 13 is increased, the mass pieces 28 move radially away from the axis of rotation, thereby deflecting diaphragm 23 axially away from sealing ring 12 and relieving the sealing load between sealing faces 14 and 15. To limit the maximum allowable displacement of mass pieces 28, the sealing ring 13 is further provided with a series of radial rigid lugs 31 aligned axially with mass pieces 28, and through each lug 31 there is an adjusting screw 32. Prior to the assembly of ring 13, a predetermined gap is set between each screw 32 and the adjoining surface of mass piece 28. Screws 32 therefore arrest the radially outward movement of the mass pieces 28 in accordance with the initial gap setting.

In assembling the parts of the FIG. 1 construction, the shaft 20 is first installed inside the shaft housing 18 in its bearing 21. Next, sealing ring 12 is inserted over shaft 20 until the bottom of the sealing ring body 25 is seated tightly in an annular ledge 33 inside housing 18. The bottom of body 25 of ring 12 has a peripheral O-ring groove to receive an O-ring 34 which forms a static seal between the body and the interior of housing 18. Although an elastomeric O-ring is shown in this assembly, it is to be understood that a metal O-ring or any other form of metallic static seal may be used in this location depending on the temperature and pressure conditions. The sealing ring 12 may be retained merely by the frictional engagement of O-ring 34 with housing 18, but, if desired, a suitable set screw (not shown) may be used to prevent ring 12 from rotating on bore ledge 33. The sealing ring 12 is assembled with its sealing edge 14 directed rightward toward the open end of housing 18.

It is desirable (but not essential for the purpose of this invention) to machine the bore ledge 33 slightly eccentric of the axis of shaft 20 so that the sealing edge 14 is eccentric also. If this is done, edge 14 will sweep a wider area of plane sealing face 15 to minimize wear and keep surface 15 cleaner as the latter rotates.

The next assembly step is to slide body 22 of ring 13 over the end of shaft 20 and adjust ring 13 to a position in which its radial sealing face 15 engages the sealing edge 14 of sealing ring 12. The body portion 22 is then fastened to shaft 20 for rotation with it by a spring dowel pin 39 which is inserted through casing port 19 into a hole 40 of the body 22 which registers with a hole 41 through shaft 20. The internal diameter of the body 22 is in sealed engagement with the shaft 20 by O-rings 42, 43. The housing 18 at its open end includes a bore 44 which provides for substantial clearance between it and the peripheral surfaces of mass pieces 28 and lugs 31 of ring 13. Owing to the large diameter of hole 41, the sealing ring 13 may be adjusted axially on shaft 20 toward and away from sealing ring 12, but the sealing ring 13 remains engaged with shaft 20 for rotation with it by means of dowel pin 39.

The initial static sealing load or mechanical pressure at the interface of sealing faces 14 and 15 is regulated by an adjusting nut 45 which bears against the end of shaft 20 and is threaded at 46 to the end of body 22 of sealing ring 13. Adjusting nut 45 is locked in any given position by a lock nut 47 which extends through nut 45 and is threaded at 48 into the end of shaft 20. With lock nut 47 released, adjusting nut 45 may be turned to urge ring 13 axially against ring 25, the diaphragm region 23 of ring 13 resiliently deflecting until the desired initial static pressure is established between faces 14 and 15. Thereafter, this static pressure will be maintained indefinitely after lock nut 47 is tightened on nut 45. The open end of housing 18 is sealed by a cap 49 to complete the assembly.

Fluid pressure is introduced into the casing 18 through port 19. This fluid pressure acts on the concave side of the sealing diaphragm 23 in a manner tending to deflect the diaphragm axially toward ring 12 and thereby increase the initial interface pressure at sealing faces 14 and 15 established by the setting of adjusting nut 45. As pressure increases, the unit load increases so long as the shaft 20 is not rotating.

The asembly will provide a static seal at the interface of sealing faces 14, 15 indefinitely.

The main function of this assembly is to provide a sealing pressure of predetermined magnitude at the interface of faces 14, 15 when the shaft 20 is rotated at high speeds relative to the casing 18. In the example of FIG. 1 the assembly is designed so that the sealing load under static conditions is very much greater than that required merely to prevent leakage of the pressure fluid. Then when shaft 20 is brought up to its operating rotational speed the mass parts 28 are adapted to be displaced by centrifugal force progressively farther from the rotational axis of the shaft, thereby axially deflecting diaphragm 27 to reduce the interface sealing load to a much lower level which is still adequate to seal against the pressure of the fluid but which greatly reduces the wear on the rubbing faces 14, 15. The mass and the position of mass pieces 28 on sealing ring 13 is such that the centrifugal displacement of pieces 28 deflects the diaphragm 23 resiliently away from ring 12. Although the deflection is measured only in thousandths or ten-thousandths of an inch, the corresponding reduction of the interface sealing load is very much greater. The assembly is therefore highly sensitive.

The adjusting screws 32 may be initially set in their respective lugs 31 to limit the ultimate allowable centrifugal displacement of mass pieces 28. The presence of adjusting screws 32 therefore make it possible to limit the extent to which the sealing load at the interface is capable of being reduced. It is possible in the assembly of FIG. 1 to adjust the screws 32 so that the sealing load is reduced entirely when the shaft 20 is rotated, allowing free leakage of fluid between sealing faces 14, 15.

Referring to the example shown in FIG. 2, the assembly includes components which differ in their design from those of the FIG. 1 assembly, but the FIG. 3 assembly includes the same basic components and has the same mode of operation as the FIG. 1 assembly.

In the FIG. 3 assembly, a non-rotatable sealing ring 112 operates with a rotatable sealing ring 113. A very narrow knife-like sealing face 114 on ring 112 engages a radially wider plain annular sealing face 115 on ring 113.

Ring 112 is seated on a ledge 133 of housing 118. Ring 113 is keyed by pin 139 for rotation with shaft 120 turning on bearing 121, inside housing 118, and the entire assembly is closed by a cap 149. Appropriate seals are provided by the several unnumbered O-rings in FIG. 3.

Ring 113 includes a thin resilient flexible diaphragm region 127 which may be deflected axially away from ring 112.

Ring 113 differs primarily from ring 13 in the FIG. 1 assembly in that ring 113 has a series of radial arcuately spaced lugs 150 (see FIG. 4) to which individual massive block-like weights 151 are attached by screws 152. These weights 151 function like their counterparts in FIG. 1 (blocks 28), but by making them for separate attachment, an even wider range of control may be obtained than in the FIG. 1 assembly in which blocks 28 are integral with ring 113. For example, in a given installation only as many blocks 151 as may be required for the desired control function (and for dynamic balance) may be mounted on lugs 150, and the remaining lugs 150 may be left blank. Also separate weights 151 simplifies the manufacture of these parts.

Ring 113 is surrounded slidably by a sleeve 122 having a flanged collar 155 containing set screws 132 to limit axial deflection of the diaphragm region 127. This collar 155 is integral with the sleeve 122 and the latter slidably surrounds another collar 158 which is threaded onto the body of ring 113 at 159. Collar 158 can be initially adjusted during assembly to limit the maximum load which can be established between sealing faces 114 and 115. The final assembly load is regulated by adjusting nut 145 which is threaded onto the end of shaft 120 and bears against the end of collar 155 to urge it and ring 113 axially toward ring 112. Static fluid pressure communicated through port 119 acts to intensify the static sealing load at faces 114, 115.

The remaining design details are believed to be obvious from FIG. 3, and the assembly and mode of operation will be evident from the explanation provided for FIG. 1.

FIG. 5 shows a side elevation of a form of rotatable sealing ring 213, partially schematic, which could be used in place of the ring 13 of FIG. 1 or the ring 113 of FIG. 3 if the body 222 of ring 213 is appropriately machined. Ring 213 includes all the features of the latter ring 113 except for the block weights 151. Ring 213 has the radial faces 210 of its arcuately spaced radial lugs 250 contoured so that as this ring is rotated in a fluid medium like oil or similar hydraulic fluid, the oil acts on the contoured faces 210 to deflect the flexible diaphragm region 227 axially toward its body portion 222. Thus the ring 213 operates dynamically like its counterparts in FIG. 1 or FIG. 3 except that with ring 213 the deflecting force is the impingement of the fluid medium on faces 210, rather than a centrifugal effect. If desired, the opposite sides of lugs 250 could be similarly contoured to cause opposite deflection of diaphragm 227. Moreover, either rings 13 or 113 in the other two assemblies may include contoured faces on their block portions so that the deflection, and therefore control of the sealing load, is effected by a combination of centrifugal and hydrodynamic effects.

Variations in the construction disclosed may be made within the scope of the appended claims.

What is claimed is:

1. A seal assembly for relatively rotatable machine parts, the assembly comprising:
   (a) a non-rotatable annular sealing ring of rigid material attached to one of said machine parts which is non-rotatable;
      (1) an annular sealing face on said non-rotatable ring;
   (b) a rotatable annular sealing ring of rigid material connected to the other of said machine parts for rotation therewith and for axial slidable movement toward said non-rotatable ring; said rotatable sealing ring having
      (1) an annular rigid body;
      (2) a rigid annular diaphragm joined to the body along an annular resiliently flexible zone whereby said diaphragm is deflectable axially relative to said body;
      (3) an annular sealing face on said diaphragm mating with said face of said non-rotatable ring in rotational sliding sealing engagement;
   (c) an adjusting nut in threaded engagement with the rotatable machine part and adapted for bearing axially on said body of said rotatable sealing ring to maintain the sealing faces of said rings pressed together and to deflect said diaphragm axially; and
   (d) a plurality of massive parts on said diaphragm which are centrifugally movable in response to the rotational speed of said rotatable sealing ring for deflecting said diaphragm and thereby varying the interface pressure between said sealing faces.

2. A seal assembly according to claim 1 wherein said annular body portion further includes means for restricting the centrifugal movement of said parts between definite limits.

3. A seal assembly according to claim 1 wherein said centrifugally movable parts are separately connected to said diaphragm.

References Cited
UNITED STATES PATENTS

| | | | |
|---|---|---|---|
| 2,556,393 | 6/1951 | Holben | 227—25 |
| 2,815,968 | 12/1957 | Coffman | 277—25 |
| 3,138,390 | 6/1964 | Jensen | 277—89 X |

FOREIGN PATENTS 705,099   3/1954   Great Britain.

SAMUEL ROTHBERG, *Primary Examiner.*

UNITED STATES PATENT OFFICE
CERTIFICATE OF CORRECTION

Patent No. 3,368,820  February 13, 1968

Ludwik S. Bialkowski

It is hereby certified that error appears in the above numbered patent requiring correction and that the said Letters Patent should read as corrected below.

Column 1, line 18, for "circumferentially" read -- centrifugally --; column 2, line 39, after "each" insert -- other --; line 57, after "rotary" insert -- seal --; column 4, line 74, for "FIG. 2" read -- FIG. 3 --.

Signed and sealed this 22nd day of April 1969.

(SEAL)
Attest:

Edward M. Fletcher, Jr.
Attesting Officer

EDWARD J. BRENNER
Commissioner of Patents